(12) United States Patent
Iriarte Lopez et al.

(10) Patent No.: US 11,983,615 B1
(45) Date of Patent: May 14, 2024

(54) AUTOMATED WELL DATA CHANNEL MAPPING METHODS AND SYSTEMS

(71) Applicant: Well Data Labs, Inc., Denver, CO (US)

(72) Inventors: Jessica G. Iriarte Lopez, Denver, CO (US); Carly T. Wolfbrandt, Denver, CO (US)

(73) Assignee: Well Data Labs, Inc., Denver, CO (US)

( * ) Notice: Subject to any disclaimer, the term of this patent is extended or adjusted under 35 U.S.C. 154(b) by 817 days.

(21) Appl. No.: 17/127,082

(22) Filed: Dec. 18, 2020

Related U.S. Application Data

(60) Provisional application No. 62/951,363, filed on Dec. 20, 2019.

(51) Int. Cl.
*G06N 20/20* (2019.01)
*G06N 5/01* (2023.01)

(52) U.S. Cl.
CPC ............... *G06N 20/20* (2019.01); *G06N 5/01* (2023.01)

(58) Field of Classification Search
CPC ..................................................... G06N 20/20
USPC .......................................................... 706/12
See application file for complete search history.

(56) References Cited

U.S. PATENT DOCUMENTS

| | | | | |
|---|---|---|---|---|
| 10,572,829 B1 * | 2/2020 | Willinger | ................ | E21B 49/00 |
| 11,193,367 B2 * | 12/2021 | Jin | .......................... | E21B 47/10 |
| 11,299,980 B2 * | 4/2022 | Felkl | .................... | G01V 99/005 |
| 11,313,211 B2 * | 4/2022 | Johnson | .................. | E21B 47/06 |
| 11,365,617 B1 * | 6/2022 | Haustveit | .............. | E21B 43/267 |
| 11,519,257 B2 * | 12/2022 | Magana-Mora | ...... | E21B 47/007 |
| 11,536,121 B1 * | 12/2022 | Basu | ........................ | G06N 3/08 |
| 11,610,124 B2 * | 3/2023 | Shrivastava | ............ | G06F 18/24 |
| 11,613,986 B1 * | 3/2023 | Iriarte Lopez | .......... | E21B 47/06 166/250.1 |
| 11,619,115 B2 * | 4/2023 | Camp | ..................... | E21B 41/00 166/250.01 |
| 11,624,265 B1 * | 4/2023 | Sehsah | .................. | E21B 29/002 166/298 |
| 11,624,277 B2 * | 4/2023 | Coenen | ................... | E21B 43/26 166/250.1 |
| 11,639,657 B2 * | 5/2023 | Madasu | .................. | E21B 47/07 166/244.1 |
| 11,669,746 B2 * | 6/2023 | Deng | ..................... | G06N 3/045 706/12 |
| 11,674,376 B2 * | 6/2023 | Singh | ..................... | E21B 49/08 166/250.1 |

(Continued)

*Primary Examiner* — Reza Nabi
(74) *Attorney, Agent, or Firm* — Polsinelli PC

(57) ABSTRACT

A method of mapping unknown well data channels involves generating, with a processor, summary statistics for unknown sequences of well data values where the well data values pertain to respective particular types of data and where each type belongs to a category of well data. The system processes the respective summary statistics with a trained super model to classify the respective sequences of well data values into categories of well data. The system then processes the summary statistics for a given sequence using a trained sub-model of the category to which the sequence belongs in order to further classify the sequence as to its particular type within the category thereby mapping originally unknown sequences of well data values to the correct category and type of well data.

20 Claims, 4 Drawing Sheets

(56) References Cited

U.S. PATENT DOCUMENTS

| | | | | |
|---|---|---|---|---|
| 11,697,985 B2* | 7/2023 | Zhang | G06Q 10/06313 166/250.01 |
| 11,698,473 B2* | 7/2023 | Torlov | G06F 18/24 367/35 |
| 11,725,500 B2* | 8/2023 | Roussel | E21B 47/06 166/250.1 |
| 11,727,176 B2* | 8/2023 | Roussel | G06F 40/117 715/234 |
| 11,734,603 B2* | 8/2023 | Al Madani | G06N 5/04 706/12 |
| 11,739,631 B2* | 8/2023 | Balan | E21B 47/06 702/2 |
| 11,746,651 B2* | 9/2023 | Zhou | G06Q 10/04 166/250.01 |
| 11,753,917 B2* | 9/2023 | Shetty | E21B 43/267 166/280.1 |
| 11,753,919 B2* | 9/2023 | Velikanov | E21B 43/267 166/305.1 |
| 11,773,314 B2* | 10/2023 | Gullickson | C09K 8/68 166/250.1 |
| 11,795,814 B2* | 10/2023 | Verma | E21B 44/00 |
| 2011/0247824 A1* | 10/2011 | Gu | E21B 43/26 166/308.1 |
| 2016/0042272 A1* | 2/2016 | Mohaghegh | G06N 3/08 706/19 |
| 2019/0024505 A1* | 1/2019 | Coenen | E21B 47/06 |
| 2019/0128111 A1* | 5/2019 | Pandey | H03M 7/30 |
| 2019/0147125 A1* | 5/2019 | Yu | G06F 30/20 703/10 |
| 2020/0065677 A1* | 2/2020 | Iriarte Lopez | E21B 49/006 |
| 2021/0017853 A1* | 1/2021 | Iriarte Lopez | E21B 47/06 |
| 2021/0209388 A1* | 7/2021 | Ciftci | G06V 10/764 |
| 2023/0009947 A1* | 1/2023 | Ruhle | E21B 47/06 |

\* cited by examiner

AUTOMATED WELL DATA CHANNEL MAPPING METHODS AND SYSTEMS

CROSS-REFERENCE TO RELATED APPLICATION

This application is related to and claims priority under 35 U.S.C. § 119(e) from U.S. Patent Application No. 62/951,363 filed Dec. 20, 2019 entitled "Automated Channel Mapping Methods and Systems," the entire contents of which is incorporated herein by reference for all purposes.

TECHNICAL FIELD

Aspects of the present disclosure involve mapping unclassified data signals to defined data channels.

BACKGROUND

Signal data from a well undergoing some form of completion operation, such as hydraulic fracturing, is typically collected and provided for processing in a predetermined format and according to predetermined mappings. The mappings correspond to particular data channels. Conventionally, signals are manually mapped to the corresponding data channel for proper downstream processing. In more detail, a subject matter expert reviews the signal data and identifies, or maps, a matching data channel to which it is assigned. In some cases, multiple signals may include differing values but identical measurement units or the like. In some cases, there is insufficient human resources available, whether expert or not, to conduct manual mapping. In yet other cases, there is insufficient time for manual mapping. As a result, it is difficult or not possible to efficiently map the data to its proper channel and signals may not be mapped or incorrectly mapped (e.g., assigned to the wrong data channel). Poorly mapped channels can result in reduced accuracy or total inaccuracy in downstream processing. In the particular case of real-time data streams, the various data channels are often not mapped making any real-time processing and analytics difficult or impossible.

It is with these observations in mind, among others, that various aspects of the present disclosure were conceived.

SUMMARY

According to at least one example, aspects of the present disclosure involve a method of mapping unknown well data channels including: accessing, with a processor, which may be a part of a computing or processing system, a data file, which may be retrieved from data storage, may be streamed data, or a combination of both, with at least a first data channel comprising a first sequence of well data values and a second data channel comprising a second sequence of well data values. The first sequence of well data values pertain to a first type of well data within a first category (or first superclass) of well data and the second sequence of well data values pertain to a second type of well data distinct from the first type of well data and within a second category (or second superclass) of well data distinct from the first category of well data. The method further involves generating, with the processor, a first plurality of summary statistics for the first sequence of well data values and a second plurality of summary statistics for the second sequence of well data values. The method the involves processing the first plurality of summary statistics and the second plurality of summary statistics with a trained super model to classify the first sequence of well data values as the first category of well data and to classify the second sequence of well data values as the second category of well data. Prior to super classification, the system was unaware of the super classes to which the sequences of well data belonged. Once super classified; the method involves processing the first plurality of summary statistics with a first trained sub-model of the first category of well data to classify the first sequence of well data with the first type of well data and processing the second plurality of summary statistics with a second trained sub-model of the second category of well data to classify the second sequence of well data with the second type of well data. At this point, the unknown well data sequences are classified into correct categories, such as pressure, proppant concentration, rate and volume, and correctly classified into the correct type for the respective category (e.g., annulus pressure, surface pressure, treating pressure and bottomhole pressure; bottomhole proppant concentration and proppant concentration; and slurry rate and clean rate; and slurry volume, clean volume and proppant total).

BRIEF DESCRIPTION OF THE DRAWINGS

The foregoing and other objects, features, and advantages of the present disclosure set forth herein will be apparent from the following description of particular embodiments of those inventive concepts, as illustrated in the accompanying drawings. Also, in the drawings the like reference characters may refer to the same parts or similar throughout the different views. It is intended that the embodiments and figures disclosed herein are to be considered illustrative rather than limiting.

DETAILED DESCRIPTION

Aspects of the present disclosure involve a method and system for classifying signal data from a well drilling, completion or other related operation (e.g., as sensor output from surface or downhole sensors, measurement while drilling system, as sensor log data, etc.) according to trained channel mappings, and generating mapped channel data as a result. Automated channel mappings save users time that might otherwise be wasted manually appraising and classifying data signals. Additionally, consistent, quick and/or accurate mappings improve the accuracy of real-time models using the mappings as input signals for feature detection and processing, and particularly when real-time processing is used to alter, confirm or otherwise related to drilling, completion or the like. Further, by avoiding incorrect mappings or providing a result that can be confirmed manually, the overall quality of the data is improved for purposes of downstream analytics.

Figure 1:
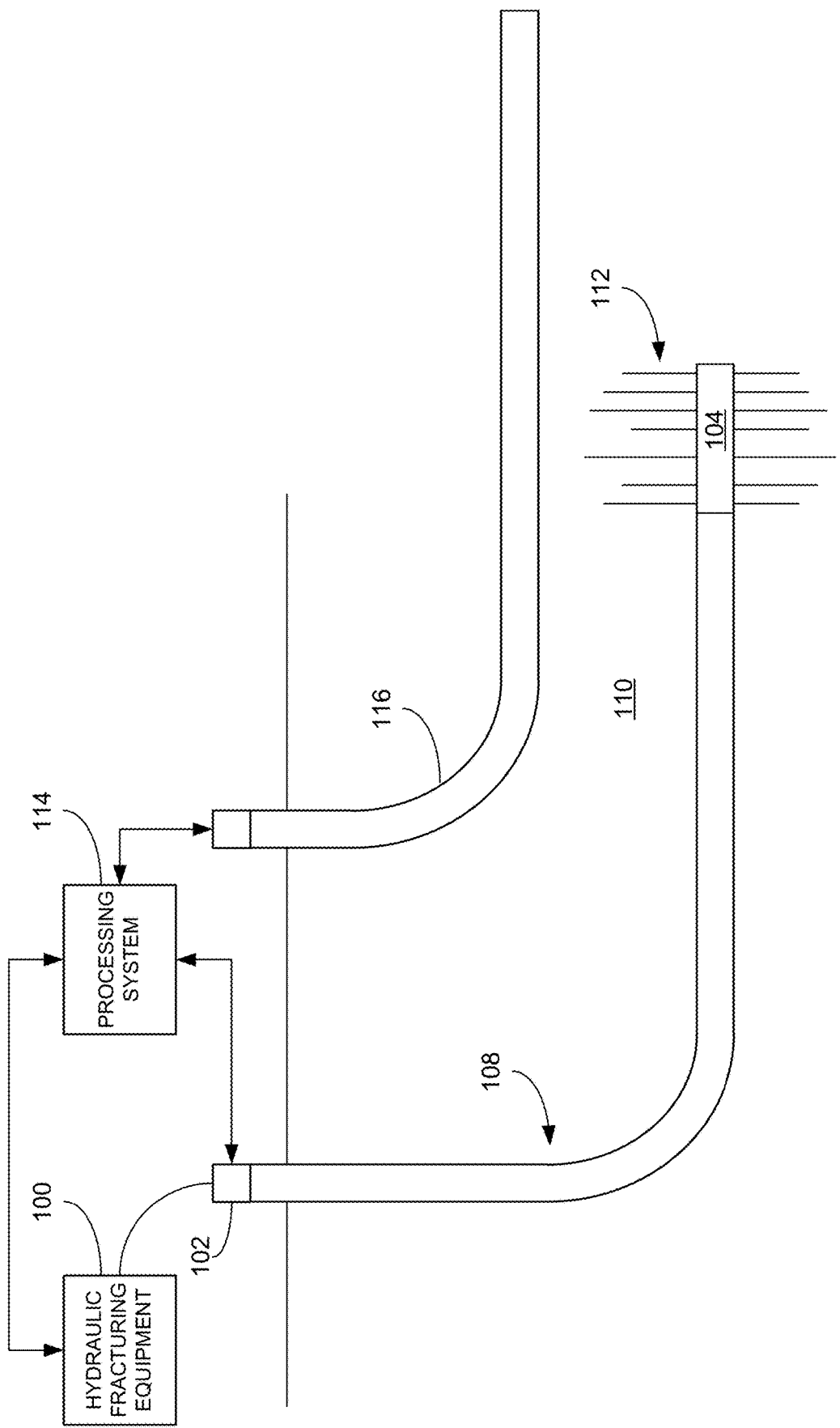
FIG. 1 is a system diagram illustrating a processing system coupled with a hydraulic fracturing system coupled with a well to hydraulic fracture a stage of the well, with the processing system to collect well processing data and process the same, according to one embodiment of the present application.

FIG. 1 is a system diagram according to aspects of the present disclosure. The system diagram is representative of a hydraulic fracture system 100 operably coupled with a well head 102, and set up to hydraulically fracture stages 104 of a horizontal section 106 of a wellbore 108. The hydraulic fracturing equipment may include pump trucks, sources of water (e.g., water trucks), and sources of proppant, diverter, and other substances that may be combined with water and injected into the well as part of the fracturing process. In some configurations, a pump truck is connected to the well head 102 and pumps, under controlled pressure and rate, the hydraulic fracturing fluid into the well which flows through a well casing (not shown) to the stage 104 being hydraulic fractured, and the fluid fractures the formation 110 surrounding the stage at perforations formed in the casing to form fractures 112. In some systems discussed herein, data and interactions with an offset well 116 may further be assessed. The offset well may be fitted with various possible sensors for measuring pressure, e.g., tubing pressure in one example, within the well or within some portion or portions of the well. The well and the equipment involved in the hydraulic fracturing process may include sensors, gauges, and other devices to monitor and record data associated with the hydraulic fracturing processes. The data may then be reported and stored at a processing system 114. Alternatively or additionally, the data may be provided as real-time streams and the system may similarly process the data streams in real-time. The processing system may involve one or more computing devices, at the well site or remote therefrom, and combinations of the same. The processing system may be in wired or wireless communication with various aspects of the well and/or the fracturing equipment.

Figure 2:
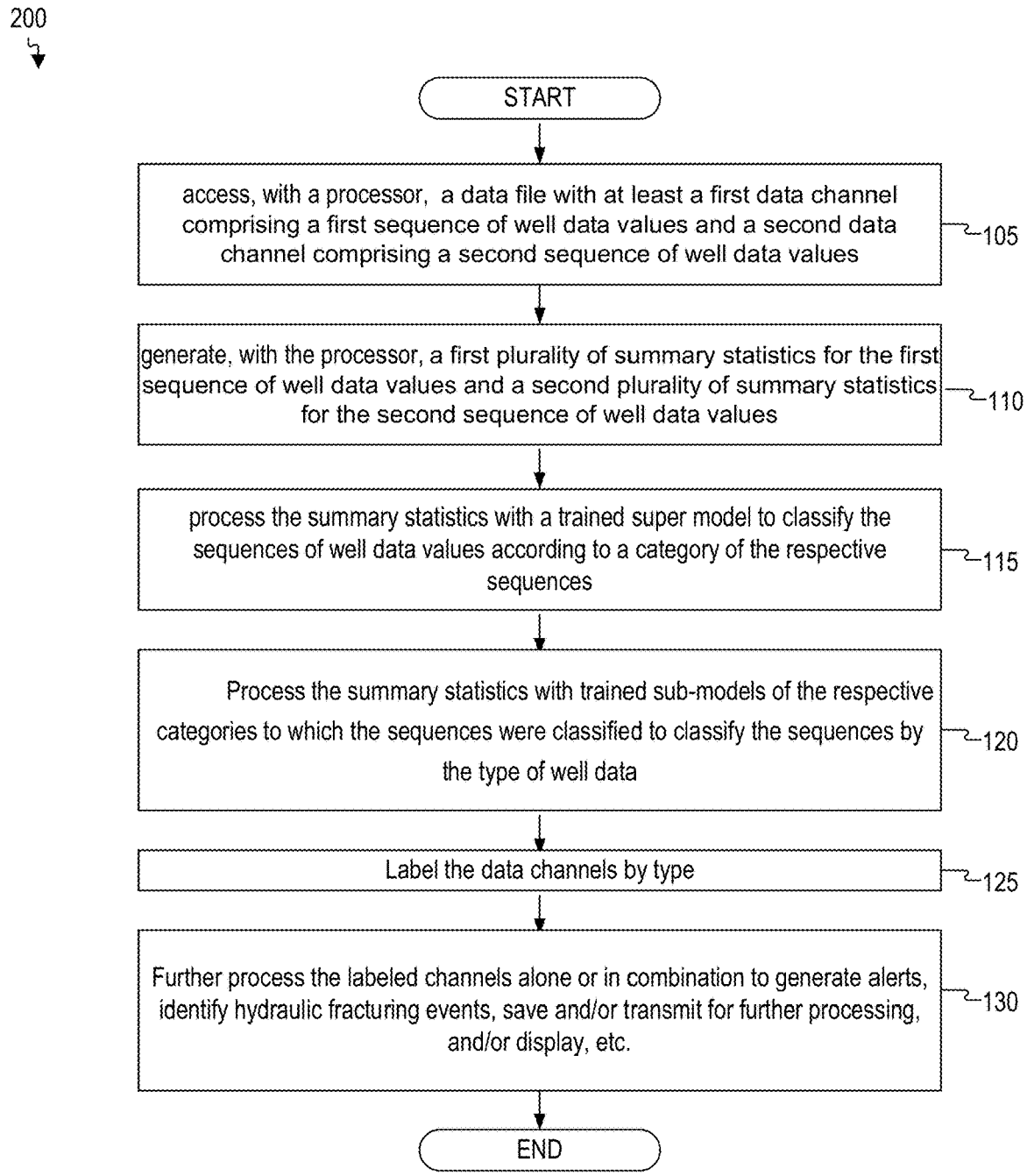
FIG. 2 is a flowchart of a method for mapping unknowns well data channels according to an example of the instant disclosure.

FIG. 2 illustrates an example method 200 for of mapping unknown well data channels. The channels are not known in the sense that the data value and the respective time value do not have a label or some other indicia indicating the category or type, with the category, of the data. So, if the channel is a sequence of treating pressure values, the system does not know that the values are treating pressure or pressure generally. In some instances, the data file may label the sequence but, in accordance with examples set out herein, the label is not necessary in mapping the channel since it can be incorrect or labeled inconsistently. Although the example method 200 depicts a particular sequence of operations, the sequence may be altered without departing from the scope of the present disclosure. For example, some of the operations depicted may be performed in parallel or in a different sequence that does not materially affect the function of the method 200. In other examples, different components of an example device or system that implements the method 200 may perform functions at substantially the same time or in a specific sequence.

According to some examples, the method includes accessing, with a processor such as provided by processing system 114, a data file with at least a first data channel comprising a first sequence of well data values and a second data channel comprising a second sequence of well data values at block 105. The first sequence of well data values pertain to a first type of well data within a first category of well data and the second sequence of well data values pertain to a second type of well data distinct from the first type of well data and within a second category of well data distinct from the first category of well data. Generally speaking, the sequences of well data values may be in a time and value format, and are often as a comma separate variable (CSV) file with data values registered each second. While two channels are described for purposes of example and to illustrate the various concepts set out herein, the number of channels from a well completion operation may exceed one hundred. Regardless, there are typically more than two data channels.

The type of well data refers to the particular type of data of any given discrete channel. The category of data, in contrast, refers to a grouping of similar types of data. For example, values including a pressure unit of measurement, e.g., pounds per square inch (PSI), may fall within a category of pressure. In the embodiments discussed herein, the sequences of well data values are associated with hydraulically fracturing a stage of a well. In one example, the type of well data includes annulus pressure, surface pressure, treating pressure and bottom hole pressure and the associated category of well data is pressure data. In another example, the type of well data includes bottomhole proppant concentration and proppant concentration and the associated category of well data is concentration data. In another example, the type of well data includes slurry rate and clean rate and the associated category of well data is rate data. In yet another example, the type of well data includes slurry volume, clean volume and proppant total and the associated category of well data is volume data. So, the data file will have one more channels with sequences of data for some combination of the various types of data, as well as possibly other data channels.

In another example of the accessing, with a processing system, at block 105, receives a real-time data stream comprising the first data channel of the first sequence of well data values and the second data channel of the second sequence of well data values. Regardless of whether the data is stored or a real-time stream, per-second data is often too granular to be helpful for downstream analytics. Moreover, per-second data can slow processing. In the case of a hydraulically fracturing a well, with non-real time data files, data is often segregated by stages. With per-second data, each stage has one data point per second for each channel, and hydraulically fracturing a stage typically results in thousands of rows for each channel of data. In one example, the system generates summary data for each channel being mapped, and often for all of the channels regardless of whether the channel is being mapped. It should be noted, that some channels of data may not be mapped such as when the data is not used for downstream analytics, if the channel is accurately mapped and labeled, etc.

According to some examples, the method includes generating, with the processing system, a first plurality of summary statistics for the first sequence of well data values and a second plurality of summary statistics for the second sequence of well data values at block 110. The first plurality of summary statistics may comprise a minimum value, a maximum value, a mean value, an average value, a median value, a first and/or second derivative of the median, a first derivative of the mean value, a second derivative of the mean value, a standard deviation, a mean absolute deviation, a variance, and percentile values. In some instances, the summary statistics may also include preexisting labels for any given channel. In yet another example, the summary statistics may include keywords. With respect to percentile values, examples include 5%, 25%, 75% and 95% quartile values, as well as quartile values for the first or second derivative values. Other quartile values are also possible. In some examples, the summary statistics may also include standard deviation of the first derivate and/or second derivative, as well as the minimum and or maximum values of the first or second derivative. The various identified summary statistics may be used in various possible combinations and other summary statistics are also possible.

Given the number and diversity of data channel types, particularly including many channels that may not be classified, the system first classifies a channel according to a super class (category) rather than immediately attempting to classify the data according to its type. For simple sets of data, the system may classify directly by type; however, for large diverse data sets typical of well data and particularly hydraulic fracturing, it has been found that a first super classification step provides greater accuracy (higher probability of the ultimate correct type classification) as well as enhanced processing type (faster).

According to some examples, the method includes processing the first plurality of summary statistics and the second plurality of summary statistics with a trained super model to classify the first sequence of well data values as the first category (first super class) of well data and to classify the second sequence of well data values as the second category (second super class) of well data at block 115. In one example, the trained super model is a random forest classifier. The trained super model classifies the various sequences of well data values according to a category. So, for example, a given channel may be classified, initially, as rate, pressure, volume or concentration (or proppant concentration). At this point, the super model is not classifying a channel as a particular type of the various categories (e.g., not be the particular type of (slurry volume, clean volume or proppant total if by volume). Instead, the super model is classifying the sequences of data according to the category of data to which the sequences are a member. So, for example, any of the various types of rate data would be classified in the rate category and the various types of volume data would be classified in the volume category.

After processing with the super classifier, the system processes the category classified summary statistics using sub-models for the particular categories. Thus, according to some examples, the method includes processing the respective summary statistics for any given sequence of data using the appropriate sub-model for the category to which the channel and its summary statistics were super classified. Thus, in the example of first and second channels, the first set (plurality) of summary statistics are classified as to the specific type of data for the channel using the sub-model for the category as determined by the super model. Similarly, the second set (plurality) of summary statistics are classified as to the specific type of data for the channel using the sub-model for the category as determined by the super model at block 120. For example, the processing system 114 illustrated in FIG. 1 may process the process the first plurality of summary statistics with a first trained sub-model of the first category of well data to classify the first sequence of well data with the first type of well data and process the second plurality of summary statistics with a second trained sub-model of the second category of well data to classify the second sequence of well data with the second type of well data. The first trained sub-model may be a random forest classifier and the second trained sub-model may also be a random forest classifier. In the examples set out herein, the processing system 114 includes the trained super model as well as the trained sub-models. However, the processing system may include distributed computing components and hence processing with the various models may similarly be distributed. It should be recognized that the reference to the first trained sub-model and the second trained sub-model may refer to two distinct models trained to classify well data channels based on the super classification of the respective channels, or may refer to the same model with two or more classification branches for the respective super classification or each sub-model may be separated into different functional blocks.

Once the sequences of well data have been properly classified according to the type of data for the particular sequence (e.g., by the type of treating pressure, annulus pressure, bottomhole pressure or surface pressure if classified in the category of pressure by the super classifier), the system may label the respective sequences of well data by type at block 125. According to some examples, the method includes labeling the first data channel with the first type of well data and labeling the second data channel with the second type of well data. For example, the processing system 114 may label the first data channel with the first type of well data and label the second data channel with the second type of well data. Labeling may include adding an identifier to the respective channels of the data file. Labeling may also involve, more generally, creating any form of association between the channel and its type.

When the channels have been properly associated with a particular type of well data, several subsequent processing operations become available. Noting, that until the systems understand the type of data for any given channel, further processing is imprecise at best and likely not possible. The following provides non-limiting examples of the further analysis and processing of properly labeled well data channels.

According to some examples, the method includes analyzing the classified first sequence of well data values and the classified second sequence of well data values to identify abnormal values of the first type or the second type; and generating an alert responsive to the identification of abnormal values of the first type or the second type at block 130. For example, the processing system 114 may analyze the classified first sequence of well data values and the classified second sequence of well data values to identify abnormal values of the first type or the second type and notify well system or otherwise generate an alert responsive to the identification of abnormal values of the first type or the second type. For pressure data, for example, one properly identified as a particular type of pressure data, the system may include thresholds for such data, e.g., high pressure values, which when exceeded generate an alert or other notification (e.g., a text message to a site operator) or notification to a well system.

According to some examples, the method includes processing the labeled first channel of well data values and the second channel of well data values to identify an event associated with hydraulically fracturing operations at block 140. Numerous possible event recognitions are possible by accessing properly labeled channel data, including but not limited to: identifying the start and end of hydraulically fracturing a stage, identifying the initial shut-in pressure, automatically identifying breakdown pressure, offset pressure and diverter, automatically identifying pressure tests and step-down tests, various real-time event detections, abnormal pressure behavior, when proppant or acid reaches the perforations of a stage, and other event recognitions that may be obtained from well data, as described in the following pending U.S. application Ser. No. 16/550,026 "MACHINE LEARNING ASSISTED EVENTS RECOGNITION ON TIME SERIES COMPLETION DATA" filed on Aug. 23, 2019, Ser. No. 16/850,972 "METHODS AND SYSTEMS FOR PROCESSING TIME-SERIES DATA USING HIGHER ORDER CHANNELS TO IDENTIFY EVENTS ASSOCIATED WITH DRILLING, COMPLE- TION AND/OR FRACTURING OPERATIONS AND ALTER DRILLING, COMPLETION AND/OR FRACTURING OPERATIONS BASED THEREON" filed on Apr. 16, 2020, Ser. No. 16/931,288 "REAL-TIME ANALYSIS OF IN-FIELD COLLECTED WELL FRACTURING DATA" filed on Jul. 16, 2020, and Ser. No. 16/951,946 "METHODS AND SYSTEMS FOR PROCESSING TIME-SERIES WELL DATA USING HIGHER ORDER CHANNELS TO IDENTIFY FEATURES THEREIN AND ALTER HYDRAULIC FRACTURING OPERATIONS BASED THEREON" filed on Nov. 18, 2020, which are each hereby incorporated by reference herein. These applications may also describe additional categories of well data and types of well data that may be automatically mapped in accordance with the techniques discussed herein.

In some instances, it may be that the amount of data available or other factors may be such that one or more sub-models cannot, with a sufficient degree of probability, classify a sequence of well data. Thus, according to some examples, the method includes labeling the first data channel with the first type of well data when the first trained sub-model of the first category of well data classifies the first sequence of well data with the first type of well data above a threshold probability (e.g., 80%) or labeling the first data channel with the first category of well data when the first trained sub-model of the first category of well data classifies the first sequence of well data with the first type of well data below the threshold probability. Thus, if a respective sub-model classifies a sequence of well data as belong to a particular type (e.g., treating pressure) with a probability of 90%, then the sequence of well data (the channel) is label for that particular type. However, if the probability is 70%, then the channel is labeled only according to its category (e.g., pressure).

Figure 3:
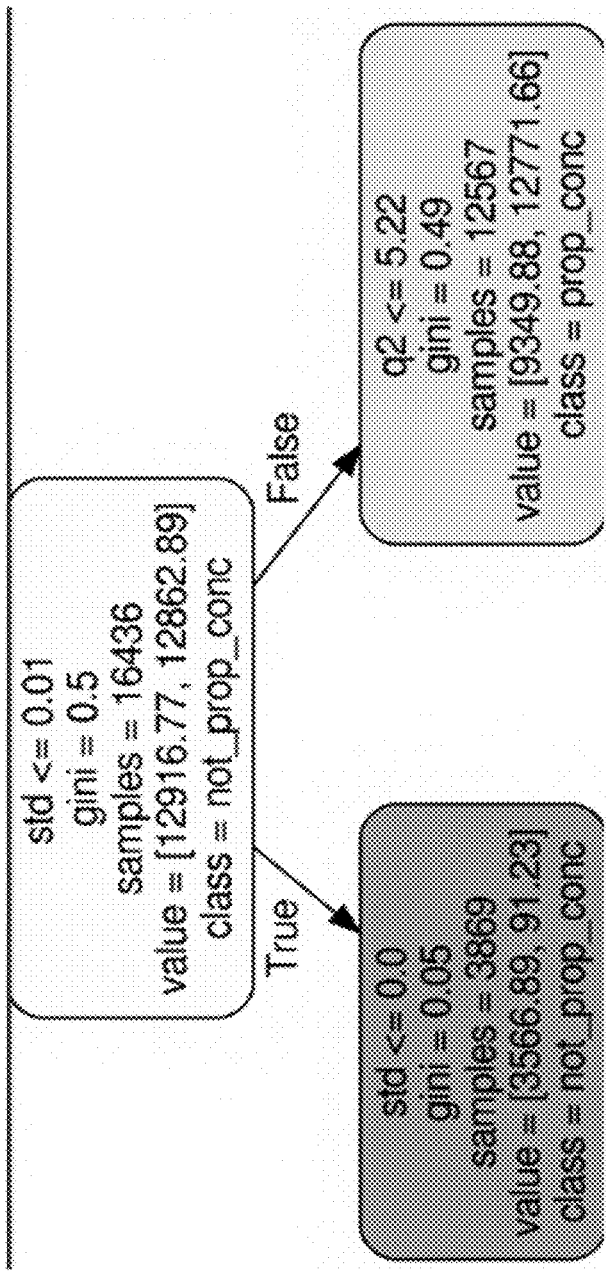
FIG. 3 illustrates an example of a decision within a random forest classifier according to an example of the instant disclosure.

FIG. 3 illustrates a discrete decision point in the hierarchical tree structure of a random forest classifier for a proppant concentration sub-model. At the illustrated decision point, the model is assessing whether to assign the data to the class of proppant concentration or not proppant concentration. Note, from the not proppant concentration decision point, the model is assessing whether to assign the data to bottomhole proppant concentration versus proppant concentration. This model is being applied after determining that the channel, by the super classifier, belongs to the type of proppant concentration (concentration generally). The particular types of proppant concentration channels are proppant concentration and bottomhole proppant concentration. At this stage, the high-level determination of whether the channel belongs to the pressure, volume, rate or proppant concentration has been completed. While the examples illustrated herein may refer to particular super classes (categories) and sub-classes (types) of well data, the concepts set out herein are applicable to other categories and types of well data.

In more detail, the summary statistics at the illustrated decision tree is std (standard deviation) is less than or equal to 0.01. At a high level, the first decision is whether or not the standard deviation of the channel is less than or equal to 0.01. The "gini" is 0.5. Gini is a feature particular to random forest classifiers and describes how often a randomly chosen element from the set would be incorrectly labeled if it was randomly labeled according to the distribution of label in the subset. The respective sample set sizes, of the raw data, and the value ranges of the raw data, are illustrated in each box.

Figure 4:
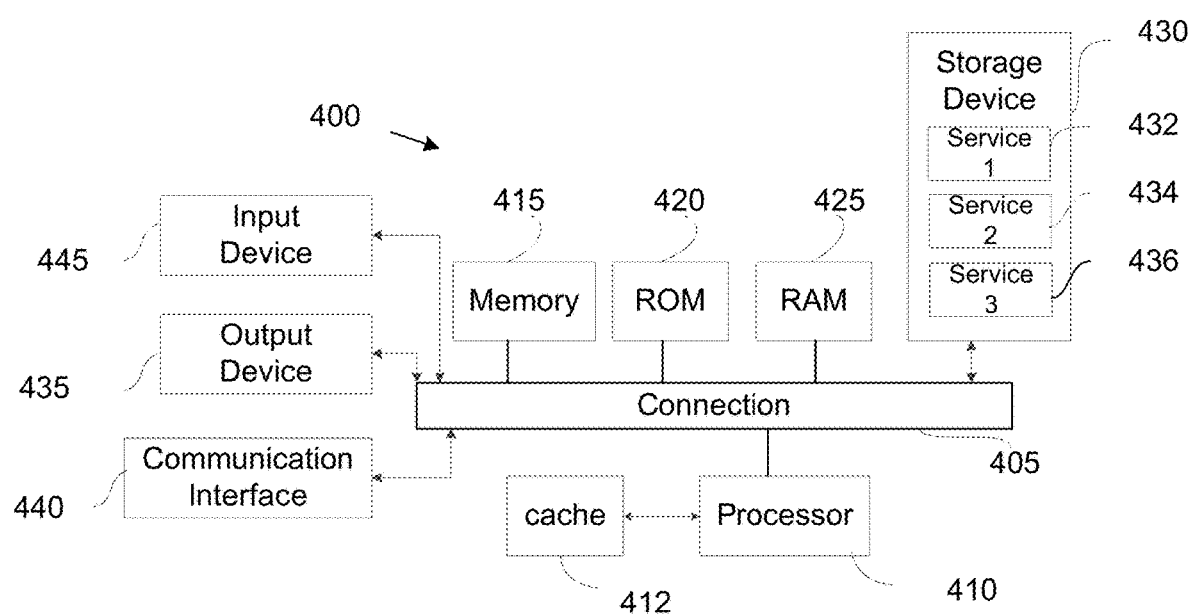
FIG. 4 shows an example of a system for implementing certain aspects of the present technology.

FIG. 4 shows an example of computing system 400. The computing system may be or may be a part of the processing system 114. The computing system may include several components and the components of the system are in communication with each other using connection 405. Connection 405 can be a physical connection via a bus, or a direct connection into processor 410, such as in a chipset architecture. Connection 405 can also be a virtual connection, networked connection, or logical connection.

In some embodiments, computing system 400 is a distributed system in which the functions described in this disclosure can be distributed within a datacenter, multiple data centers, a peer network, etc. With regard to the processing system 114, the system receives data from the well, e.g., a stream or streams, including from the hydraulic fracturing equipment as well as downhole equipment and otherwise. The system may also access the data from storage, as well as from a combination of storage and streams. In some embodiments, one or more of the described system components represents many such components each performing some or all of the function for which the component is described. In some embodiments, the components can be physical or virtual devices.

Example system 400 includes at least one processing unit (CPU or processor) 410 and connection 405 that couples various system components including system memory 415, such as read-only memory (ROM) 420 and random access memory (RAM) 425 to processor 410. Computing system 400 can include a cache of high-speed memory 412 connected directly with, in close proximity to, or integrated as part of processor 410.

Processor 410 can include any general purpose processor and a hardware service or software service, such as services 432, 434, and 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction, computing system 400 includes an input device 445, which can represent any number of input mechanisms, such as a microphone for speech, a touch-sensitive screen for gesture or graphical input, keyboard, mouse, motion input, speech, etc. Computing system 400 can also include output device 435, which can be one or more of a number of output mechanisms known to those of skill in the art. In some instances, multimodal systems can enable a user to provide multiple types of input/output to communicate with computing system 400. Computing system 400 can include communications interface 440, which can generally govern and manage the user input and system output. There is no restriction on operating on any particular hardware arrangement, and therefore the basic features here may easily be substituted for improved hardware or firmware arrangements as they are developed.

Storage device 430 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 430 can include software services, servers, services, etc., that when the code that defines such software is executed by the processor 410, it causes the system to perform a function. In some embodiments, a hardware service that performs a particular function can include the software component stored in a computer-readable medium in connection with the necessary hardware components, such as processor 410, connection 405, output device 435, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

Various embodiments of the disclosure are discussed in detail above. While specific implementations are discussed, it should be understood that this is done for illustration purposes only. A person skilled in the relevant art will recognize that other components and configurations may be used without parting from the spirit and scope of the disclosure. Thus, the description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" "one example" or "an aspect" or "an embodiment" means that a particular feature, structure, or characteristic described in connection with the embodiment, example, etc., is included in at least one embodiment of the disclosure. The appearances of the phrase "in one embodiment" etc. in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure are set forth in the description, and in part will be obvious from the description, or can be learned by practice of the herein disclosed principles. The features and advantages of the disclosure can be realized and obtained by means of the instruments and combinations particularly pointed out in the appended claims.

What is claimed is:

1. A method of mapping unknown well data channels comprising: accessing, with a processor, a data file with at least a first data channel comprising a first sequence of well data values and a second data channel comprising a second sequence of well data values, wherein the first sequence of well data values pertain to a first type of well data within a first category of well data and the second sequence of well data values pertain to a second type of well data distinct from the first type of well data and within a second category of well data distinct from the first category of well data; generating, with the processor, a first plurality of summary statistics for the first sequence of well data values and a second plurality of summary statistics for the second sequence of well data values; processing the first plurality of summary statistics and the second plurality of summary statistics with a trained super model to classify the first sequence of well data values as the first category of well data and to classify the second sequence of well data values as the second category of well data; processing the first plurality of summary statistics with a first trained sub-model of the first category of well data to classify the first sequence of well data with the first type of well data; and processing the second plurality of summary statistics with a second trained sub-model of the second category of well data to classify the second sequence of well data with the second type of well data, wherein the first plurality of summary statistics comprise a minimum value, a maximum value, a mean value, an average value, a first derivative of the mean value, a second derivative of the mean value, a standard deviation, a mean absolute deviation, a variance, and percentile values, wherein the first sequence of well data values and the second sequence of well data values are associated with hydraulically fracturing a stage of a well.

2. The method of claim 1 wherein the first type of well data includes annulus pressure, surface pressure, treating pressure and bottomhole pressure and wherein the first category of well data is pressure data and the second type of well data includes bottomhole proppant concentration and proppant concentration and wherein the second category of well data is concentration data.

3. The method of claim 1 wherein the first type of well data includes slurry rate and clean rate and wherein the first category of well data is rate data and the second type of well data includes slurry volume, clean volume and proppant total and wherein the second category of well data is volume data.

4. The method of claim 1 wherein the trained super model is a random forest classifier.

5. The method of claim 1 wherein the first trained sub-model is a random forest classifier and the second trained sub-model is a random forest classifier.

6. The method of claim 1 wherein the accessing a data file comprises: receiving a real-time data stream comprising the first data channel of the first sequence of well data values and the second data channel of the second sequence of well data values.

7. The method of claim 6 further comprising analyzing the classified first sequence of well data values and the classified second sequence of well data values to identify abnormal values of the first type or the second type; and generating an alert responsive to the identification of abnormal values of the first type or the second type.

8. The method of claim 1 further comprising labeling the first data channel with the first type of well data and labeling the second data channel with the second type of well data.

9. The method of claim 8 further comprising processing the labeled first channel of well data values and the second channel of well data values to identify an event associated with hydraulically fracturing operations.

10. The method of claim 1 further comprising labeling the first data channel with the first type of well data when the first trained sub-model of the first category of well data classifies the first sequence of well data with the first type of well data above a threshold probability or labeling the first data channel with the first category of well data when the first trained sub-model of the first category of well data classifies the first sequence of well data with the first type of well data below the threshold probability.

11. A system comprising: a storage with computer executable instructions; a processor to execute the computer executable instructions and cause the processor to: access, with the processor, a data file with at least a first data channel comprising a first sequence of well data values and a second data channel comprising a second sequence of well data values, wherein the first sequence of well data values pertain to a first type of well data within a first category of well data and the second sequence of well data values pertain to a second type of well data distinct from the first type of well data and within a second category of well data distinct from the first category of well data, generate, with the processor, a first plurality of summary statistics for the first sequence of well data values and a second plurality of summary statistics for the second sequence of well data values, process the first plurality of summary statistics and the second plurality of summary statistics with a trained super model to classify the first sequence of well data values as the first category of well data and to classify the second sequence of well data values as the second category of well data, process the first plurality of summary statistics with a first trained sub-model of the first category of well data to classify the first sequence of well data with the first type of well data, and process the second plurality of summary statistics with a second trained sub-model of the second category of well data to classify the second sequence of well data with the second type of well data, wherein the first plurality of summary statistics comprise a minimum value, a maximum value, a mean value, an average value, a first derivative of the mean value, a second derivative of the mean value, a standard deviation, a mean absolute deviation, a variance, and percentile values, wherein the first sequence of well data values and the second sequence of well data values are associated with hydraulically fracturing a stage of a well.

12. The system of claim 11 wherein the first type of well data includes annulus pressure, surface pressure, treating pressure and bottomhole pressure and, the first category of well data is pressure data and the second type of well data includes bottomhole proppant concentration and proppant concentration and the second category of well data is concentration data.

13. The system of claim 11 wherein the first type of well data includes slurry rate and clean rate and, the first category of well data is rate data and the second type of well data includes slurry volume, clean volume and proppant total and the second category of well data is volume data.

14. The system of claim 11 wherein the trained super model is a random forest classifier.

15. The system of claim 11 wherein the first trained sub-model is a random forest classifier and the second trained sub-model is a random forest classifier.

16. The system of claim 11 wherein the access a data file comprises receive a real-time data stream comprising the first data channel of the first sequence of well data values and the second data channel of the second sequence of well data values.

17. The system of claim 16 wherein the processor further executes the instructions to:

analyze the classified first sequence of well data values and the classified second sequence of well data values to identify abnormal values of the first type or the second type; and generate an alert responsive to the identification of abnormal values of the first type or the second type.

18. The system of claim 11 wherein the processor further executes the instructions to label the first data channel with the first type of well data and label the second data channel with the second type of well data.

19. The system of claim 18 wherein the processor further executes the instructions to process the labeled first channel of well data values and the second channel of well data values to identify an event associated with hydraulically fracturing operations.

20. The system of claim 11 wherein the processor further executes the instructions to label the first data channel with the first type of well data when the first trained sub-model of the first category of well data classifies the first sequence of well data with the first type of well data above a threshold probability or label the first data channel with the first category of well data when the first trained sub-model of the first category of well data classifies the first sequence of well data with the first type of well data below the threshold probability.

\* \* \* \* \*